Dec. 2, 1924.
J. T. GANTT
DETACHABLE RIM FOR WHEELS
Filed April 18, 1924
1,517,721
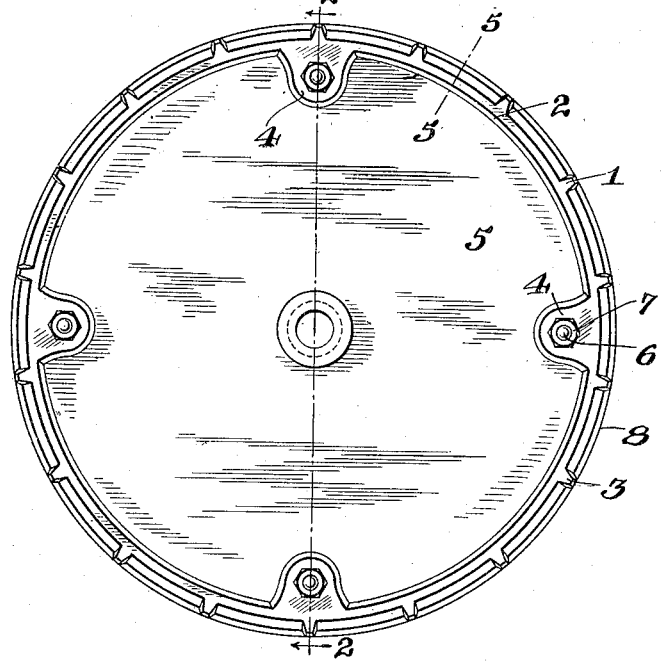
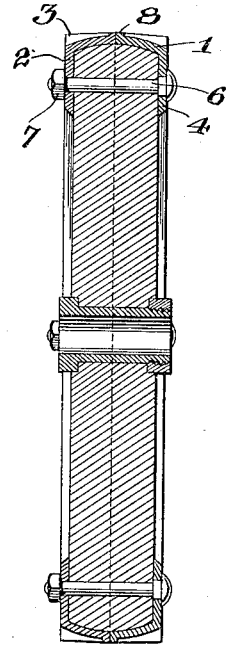
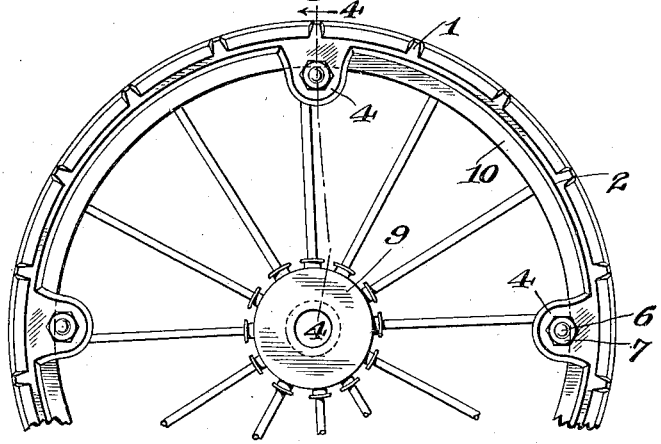
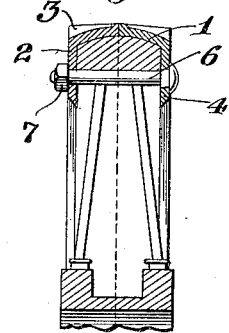
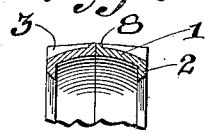
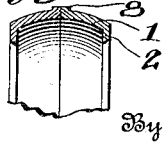
Inventor
James T. Gantt
By Mason Fenwick & Lawrence
Attorneys Patented Dec. 2, 1924.

1,517,721

UNITED STATES PATENT OFFICE.

JAMES T. GANTT, OF MACON, GEORGIA.

DETACHABLE RIM FOR WHEELS.

Application filed April 18, 1924. Serial No. 707,489.

*To all whom it may concern:*

Be it known that I, JAMES T. GANTT, citizen of the United States, residing at Macon, in the county of Bibb and State of Georgia, have invented certain new and useful Improvements in Detachable Rims for Wheels; and I do hereby declare the following to be a full, clear, and exact description of the invention, such as will enable others skilled in the art to which it appertains to make and use the same.

This invention relates to improvements in detachable rim sections for wheels, and more particularly to a pair of split annular rim sections which are substantially L shaped in cross section and are adapted to be positioned about a solid wheel or a wheel provided with a felly, hub, and inner connecting spokes.

An object of the invention is to provide a suitable construction of auxiliary or detachable split annular rim sections of substantially L shape in cross section for positioning about a wheel to extend over the rim surface thereof and over a portion of the parallel sides of the wheel or felly, and to provide suitable means for holding the annular rim sections on said wheel in operative position, for the purpose of providing an iron face or tread to a wood wheel to prolong the life of the wheel and retain its true circumference. A wood wheel without an iron rim or face will wear to an irregular shape and soon become useless.

Other objects will appear as the description proceeds.

In the accompanying drawings which form a part of my application,

Figure 1 is a side elevation of my improved detachable annular split rim sections positioned on a solid wheel.

Figure 2 is a sectional view taken on the line 2—2 of Figure 1.

Figure 3 is a partial side elevation of my improved split rim sections attached to an ordinary construction of spoked wheel.

Figure 4 is a sectional view taken on the line 4—4 of Figure 3.

Figure 5 is a sectional view taken on the line 5—5 of Figure 1, and

Figure 6 is a transverse sectional view through my annular split rim sections, the same being provided with a smooth surface or tread.

Like characters of reference are used throughout the following specification and the accompanying drawings to designate corresponding parts.

My invention comprises a pair of split annular rim sections, which are substantially L shaped in cross section, thereby forming the tread portions 1 and the inwardly extending side portions 2, which are adapted to extend flush with the sides of a solid wheel, or the sides of a felly of an ordinary type of spoked wheel.

The tread sections or portions 1 of the rim sections may be provided with up-raised ribs 3 to assist the traction of the wheel. A plurality of inwardly extending lugs 4 are formed integrally and in the same plane with the side portions 2 of the rim sections, and are adapted to be oppositely disposed on either side of the wheel 5. The said lugs 4 and the ribs 3 across the face of the wheel are purposely and specially arranged in a novel way by which the rims can be secured to the wheel so that the ribs across the face of the wheel can be opposite each other or zig-zag without having to use extra rims. lugs, or bolts, by simply moving one of the rims one fourth the distance around the side of the wheel, which brings the lugs 4 opposite each other in either case.

One peculiar feature of my invention is that although consisting of two pieces, both pieces are made from one pattern and are identical in construction, yet so constructed as to be arranged on the wheel so that the ribs or cross sections 3 can be directly opposite each other, or zig-zag at the option of the user, without the use of extra rims, lugs or bolts. This feature eliminates the necessity of making the rims in rights and lefts, or two separate patterns, and renders the invention more useful. A bolt 6 will extend through the said lugs and wheel to hold the rims in position. Nuts 7 will be threaded on to the ends of the bolts 6 to hold the same in place. Annular flanges 8 are formed at the adjoining edges of the tread portions of the rim sections and serve to provide a better bearing for the same.

When it is desired to use the split annular rim sections on a disk or solid wheel, the attaching bolt 6 will extend through the lugs 4 of the rim sections and also through the wheel 5, to hold the said rim sections in operative position. However, when the rim sections are to be positioned on and used with the ordinary type of spoked wheel 9, the attaching bolts will connect the oppositely disposed lugs on the side portions of the rim sections and will extend across the inner surface of the felly 10 and immediately adjacent thereto.

It will be understood that my improved split annular rim sections can be used either with or without the upraised ribs 3 as shown in Figure 6. These rim sections are especially adapted for use on small implement wheels, on cotton and corn planters, guano distributors, etc., but of course they may be used in any desired manner. Many minor changes in detail of construction may be resorted to without departure from the spirit of the invention.

I claim:

1. A device for covering the rim or the periphery of a wheel, comprising a pair of split annular rim sections adapted to extend over the rim or periphery of the wheel and to extend inwardly on the opposite sides thereof, and means for connecting said rim sections to hold the same in operative position.

2. A device for covering the rim or periphery of a wheel, comprising a pair of split annular rim sections substantially L shaped in cross section, said annular rim sections being adapted to cover the rim or periphery of a wheel and to extend a distance inwardly on the opposite sides of said wheel, spaced lugs formed on said inwardly extending portions of the rim sections and means extending through said lugs and wheel for holding said rim sections in operative position, said lugs being so arranged that the split rim sections can be secured to the wheel with the ribs opposite each other, or zig-zag without necessitating the use of extra rims, lugs or bolts.

3. A device for covering the rim or periphery of a wheel, comprising a pair of split annular rim sections, substantially L shaped in cross section, said rim sections being adapted to extend over the rim or periphery of a wheel and inwardly along the parallel sides thereof, flanges formed on the adjoining edges of said rim sections, spaced inwardly extending lugs formed on the side portions of said rim sections, and means adapted to extend through said lugs and wheel to hold the said rims in operative position.

4. The combination as set forth in claim 2, and upraised ribs formed transversely across the tread portions of said rim sections, whereby the traction of said wheel will be increased.

In testimony whereof I affix my signature.

JAMES T. GANTT.